J. B. BARNES.
VEHICLE WHEEL.
APPLICATION FILED FEB. 5, 1908.
905,832.
Patented Dec. 8, 1908.
2 SHEETS—SHEET 1.
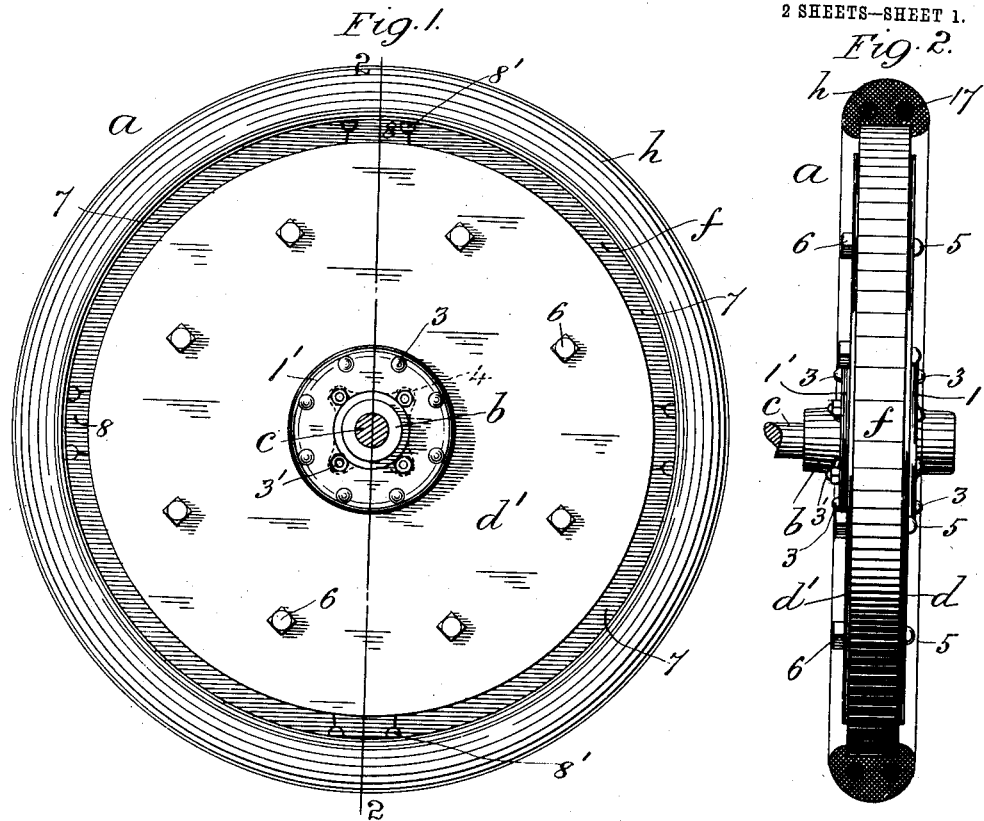
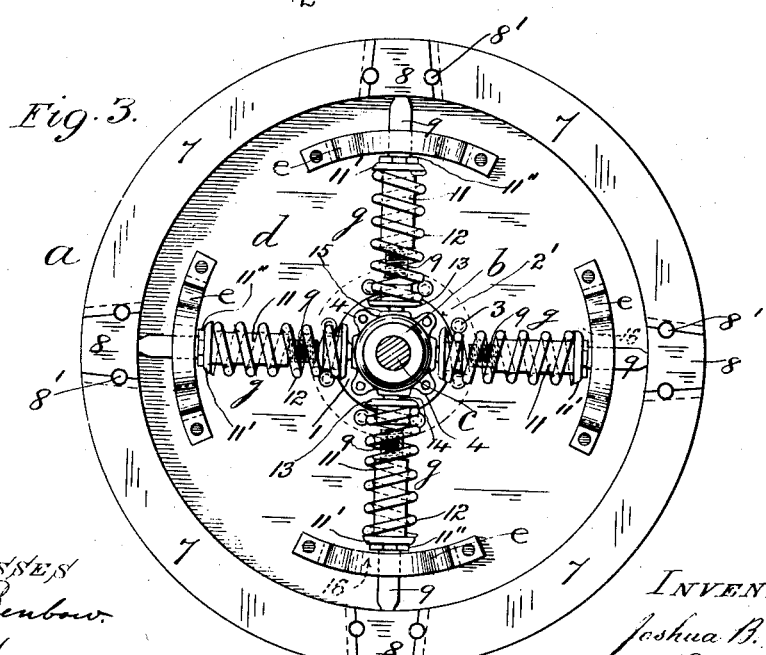
WITNESSES
INVENTOR
Joshua B. Barnes
By Edward W. Furnett
His Atty

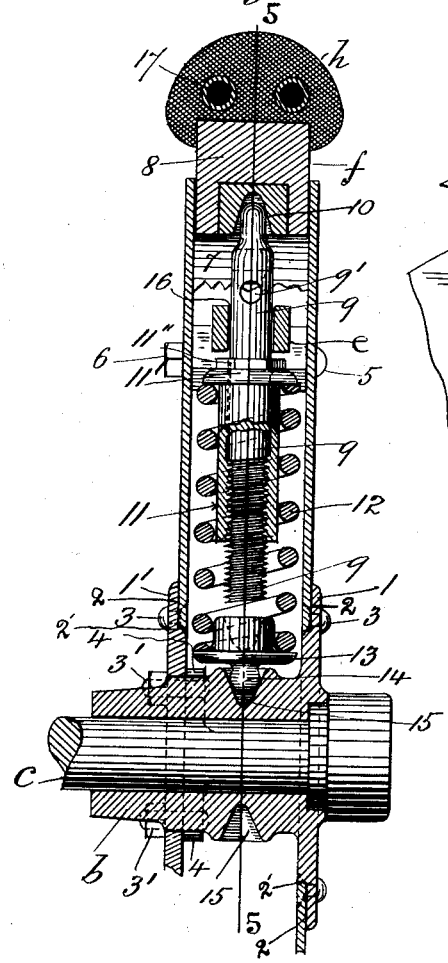
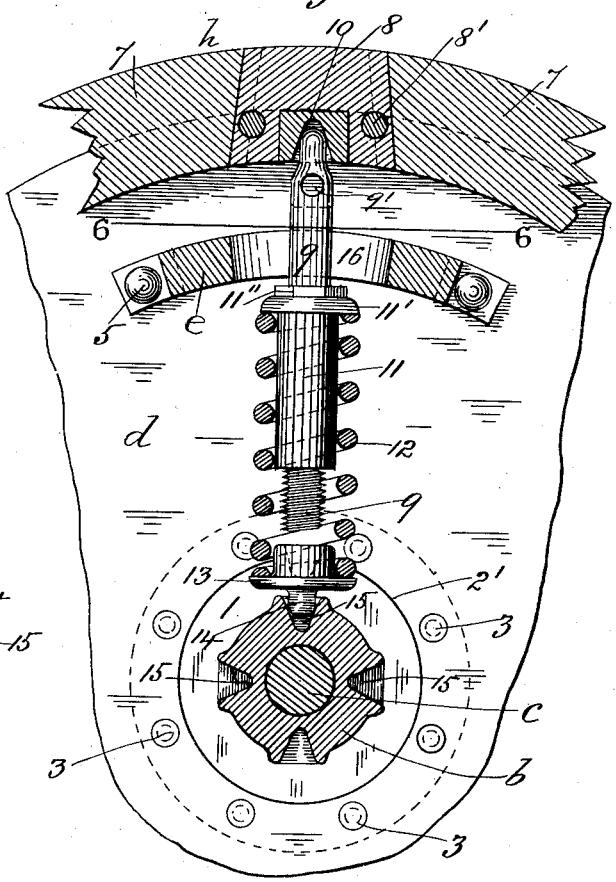
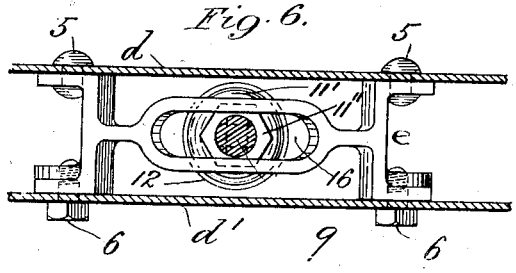
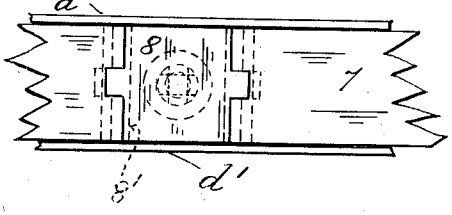

UNITED STATES PATENT OFFICE.

JOSHUA B. BARNES, OF FORT WAYNE, INDIANA.

VEHICLE-WHEEL.

No. 905,832.　　　　Specification of Letters Patent.　　　　Patented Dec. 8, 1908.

Application filed February 5, 1908. Serial No. 414,391.

*To all whom it may concern:*

Be it known that I, JOSHUA B. BARNES, a citizen of the United States, residing at Fort Wayne, in the county of Allen and State of Indiana, have invented a new and useful Improvement in Vehicle-Wheels, of which the following is a specification.

My invention relates to a vehicle wheel, and is particularly applicable to the front steering wheel of an automobile having a pneumatic tire and subjected to sudden violent shocks which are liable to cause breakage or undue straining of the felly or spokes and irregular yielding and puncture of the tire when its resiliency is most needed.

My invention has for its object to provide a strong and durable wheel having a solid rubber tire which with the felly is adapted to yield uniformly for maintaining the shape and efficiency of the wheel.

It consists in features of novelty as hereinafter described and claimed, reference being had to the accompanying drawing forming part of this specification, whereon, Figure 1, is a side elevation of my improved vehicle wheel; Fig. 2, an edge view thereof with the tire in vertical cross section on line 2, 2, in Fig. 1; Fig. 3, a side elevation of the wheel with the tire and front side plate forming part of my invention removed; Fig. 4, a vertical cross section to enlarged scale through the wheel (broken away) on line 2, 2, in Fig. 1; Fig. 5, a vertical section thereof through the plane of the wheel on line 5, 5, in Fig. 4; Fig. 6, a horizontal section on line 6, 6, in Fig. 5, showing one of the side plate braces forming part of my invention; and Fig. 7, a top plan view of part of the felly corresponding to that seen in Figs. 4, and 5.
Like letters and numerals of reference denote like parts in all the figures.

*a* represents my improved vehicle wheel having a circular metallic hub *b* which is adapted to fit the axle *c* in the usual manner and formed circumferentially with a circular flange 1 of suitable diameter integral therewith, the flange 1 being formed preferably, on the inside for a suitable distance from its circumference with a recess 2 having its inner shoulder 2' concentric with the hub *b*, and to the side of the flange 1 within the recess 2 is fixed by rivets 3 (screws or otherwise), the corresponding portion of a centrally perforated vertically arranged sheet metal (preferably steel) plate *d* having its inner circular edge surrounding and bearing against the shoulder 2' of the recess 2 and its outer edge concentric with the hub *b*, the plate *d* forming one side of the wheel *a*, while around the hub *b* opposite to the flange 1 at a suitable distance therefrom, is fitted a circular disk 1' having an inside recess 2 and shoulder 2' similar to the flange 1, and removably fixed by studs 3' to lugs 4 cast on the hub *b*; and to the side of the disk 1' within its recess 2 is fixed by the rivets 3, a vertically arranged sheet metal plate *d'* which is opposite and parallel, and similar in every respect to the plate *d*, and forms the other side of the wheel *a*, the side plates *d* and *d'* being fixed to each other by a series of circular segmental braces *e* which are concentric with the hub *b* at suitable distances apart (preferably at four equal parts or quarters of the wheel *a* as shown), the braces *e* being fixed to the side plate *d* by rivets 5 and to the side plate *d'* by screws 6, whereby the latter with the disk 1' is removable when required, from the hub *b* for obtaining access to the internal parts. It is here noted that the rivets 3 which secure the plates *d* and *d'* to the flange 1 and disk 1' respectively, are preferably countersunk and flush with the said plates on the inside for insuring an unobstructed surface thereof.

*f* is the felly which is circumferentially larger than the side plates *d*, *d'*, and preferably, composed of wood in preferably four, equal segmental parts or sections 7 held in place by four tapered wood keys 8 which are inserted, between the adjacent ends of the segments 7 from the inside of the felly *f* and form a continuation thereof, the keys 8 being tenoned into corresponding mortises in the said ends of the segments 7 and fixed to the latter thereat by circular wood keys 8' driven laterally therethrough and flush with the sides of the felly *f*.

The felly *f* when assembled and in its normal position concentric with the hub *b*, is partway of its depth within the space between the side plates *d* and *d'* and adapted to slide laterally against the inner faces of the latter adjacent to their outer edges, the felly *f* being normally held in place by preferably, four adjustable spokes *g* consisting respectively, of a rotatable bolt 9 which is preferably, semi-spherical or ball-shaped at its outer end and centered thereat in a preferably, conical recess or bearing 10 (see Figs. 4 and 5) which is let preferably into the corresponding key 8 of the felly $f$ on its concave side, the opposite or inner end portion of the bolt 9 being screw-threaded and adapted to be rotated through a correspondingly screw-threaded sleeve or bush 11 having an outer collar 11' which is adapted to bear upon the outer end of a spiral spring 12 surrounding the sleeve 11, the inner end of the spring 12 being clear of the inner end of the bolt 9 and sleeve 11, and adapted to bear on a preferably, circular plate 13 having a semi-spherical or ball-shaped projection 14 which is centered in a preferably, conical recess or bearing 15 formed in the circumference of the hub $b$ opposite to the bearing 10 in the felly $f$, and midway between the side plates $d$ and $d'$, the bolt 9 with its sleeve 11 and spring 12 being normally radial to the wheel $a$ but adapted to be moved in the bearings 10 and 15 to either side of its radial position in the plane of the wheel $a$ obediently to the movements of the felly $f$, as hereinafter more particularly referred to.

Transversely through the bolt 9 adjacent to the outer end of the sleeve 11, are holes 9' for the insertion therethrough of a suitable tool for rotating the bolt 9, the outer end of the sleeve 11 having a hexagon or other suitably shaped portion 11'' adapted to be engaged by a spanner for preventing the rotation of the sleeve 11 when rotating the bolt 9. Through the brace $e$ corresponding to the adjustable spoke $g$ above described, is formed midway between the side plates $d$ and $d'$ and radially to the hub $b$, a longitudinal slotway 16, through which that portion of the bolt 9 on the outside of the hexagon top 11'' of the sleeve 11, freely plays, the slotway 16 corresponding at the middle to the bolt 9 when in its normal position and extending therefrom longitudinally to each side thereof for a suitable distance for permitting the vibration of the bolt 9 in the movements before mentioned of the felly $f$, the ends of the slotway 16 operating as limiting stops to this vibration, and its sides to prevent lateral displacement of the bolt 9.

Surrounding the felly $f$ is preferably, a solid rubber tire $h$ which preferably, projects beyond and overlaps the lateral edge portion of the felly $f$, suitable space or clearance for the play of the latter being left between the lower circular overlapped portion of the tire $h$ and the circumferential edges of the side plates $d$ and $d'$. Embedded in the tire $h$ are the usual metallic tubular rings or bonds 17 for reinforcing and maintaining the contour and stability of the tire $h$.

In operation, on the application of pressure to any part of the circumference of the tire $h$ and felly $f$, the springs 12 in the half of the wheel $a$ on the corresponding side of its dividing or neutral line for the time being, are proportionately compressed and in the other half expanded, the tire $h$ and felly $f$ at the same time being correspondingly moved to and fro (the latter between the side plates $d$ and $d'$) and the bolts 9 with their sleeves 11 and springs 12 vibrated accordingly to either side of their normal central position in the bearings 10 and 15 of the felly $f$ and hub $b$ respectively, the said compression and expansion of the springs 12 being automatically adjustable obediently to the multitudinous changing positions of the tire $h$ and felly $f$ and thereby maintaining the contour and efficiency of the wheel $a$ under all conditions. The tension of either or all the springs 12 may be increased or reduced as required, by holding the sleeve 11 and rotating the bolts 9 with their screw-threaded portions therethrough in the required direction for moving the collars 11' of the sleeves 11 to or from the circular plates 13 and thereby expanding or compressing the springs 12 accordingly as the case may be.

What I claim as my invention and desire to secure by Letters Patent is:—

1. In a vehicle wheel, the combination of a metallic hub, two opposite metallic plates fixed to and concentric with the hub and adapted to form the corresponding sides of the wheel, one of the said plates being removably fixed to the hub, a suitable felly circumferentially larger than, and partly slidable between and against the said plates, a tire on the felly, a series of adjustable spokes normally radial to the wheel between the said plates, and consisting respectively, of a rotatable bolt having its outer end centered in the felly, and having a screw-threaded portion, a sleeve surrounding the bolt and screw-threaded internally for engagement with the said portion, a collar on the sleeve, a spring surrounding the sleeve and engaged at one end by the said collar, and a plate centered in the hub and adapted to engage the other end of the spring, substantially as described and for the purpose set forth.

2. In a vehicle wheel, the combination of a metallic hub, two opposite metallic plates fixed to and concentric with the hub and adapted to form the corresponding sides of the wheel, one of the said plates being removably fixed to the hub, means for securing the said plates to each other, a suitable felly circumferentially larger than, and partly slidable between and against the said plates, a tire on the felly, a series of adjustable spokes normally radial to the wheel between the said plates, and consisting respectively, of a rotatable bolt having its outer end centered in the felly, and having a screw-threaded portion, a sleeve surrounding the bolt and screw-threaded internally for engagement with the said portion, a collar on the sleeve, a spring surrounding the sleeve and engaged at one end by the said collar, a plate centered in the hub and adapted to engage the other end of the spring, and means for limiting the vibratory and lateral movements of the said bolt, substantially as described.

In testimony whereof I have signed my name to this specification in the presence of two subscribing witnesses.

JOSHUA B. BARNES.

Witnesses:
W. W. SHRYOCK,
FLORENCE E. MERZ.